Figure 1:
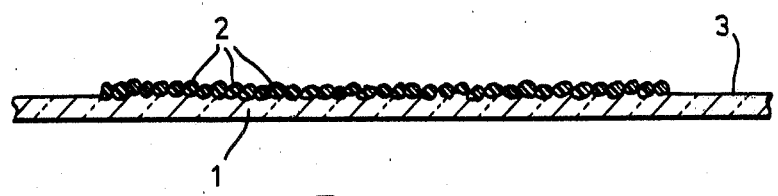

United States Patent [19]

Haq

[11] 4,416,791
[45] Nov. 22, 1983

[54] PACKAGING FILM AND PACKAGING OF DETERGENT COMPOSITIONS THEREWITH

[75] Inventor: Zia Haq, Wirral, England

[73] Assignee: Lever Brothers Company, New York, N.Y.

[21] Appl. No.: 437,390

[22] Filed: Oct. 28, 1982

[30] Foreign Application Priority Data

Nov. 11, 1981 [GB] United Kingdom ............... 8133992

[51] Int. Cl.$^3$ .............................................. C11D 17/00
[52] U.S. Cl. ...................................... 252/90; 206/0.5; 206/524.3; 206/524.7; 428/913; 428/35
[58] Field of Search ............... 252/90; 206/0.5, 524.3, 206/524.7; 428/913, 905, 35

[56] References Cited

U.S. PATENT DOCUMENTS

| | | | |
|---|---|---|---|
| 3,186,869 | 6/1965 | Friedman | 117/138.8 |
| 3,277,009 | 10/1966 | Freifeld | 252/90 |
| 3,322,674 | 5/1967 | Friedman | 252/90 |
| 3,413,229 | 11/1968 | Bianco et al. | 252/90 |
| 3,661,695 | 5/1972 | Berliner | 161/151 |
| 3,762,454 | 10/1973 | Wilkins, Jr. | 428/913 |
| 3,787,382 | 1/1974 | Wright et al. | 260/92.1 R |
| 3,790,067 | 2/1974 | Scheier | 229/55 |
| 3,859,125 | 1/1975 | Miller | 117/155 UA |
| 3,860,117 | 1/1975 | Walus | 206/461 |
| 4,062,451 | 12/1977 | Gander | 428/35 |
| 4,188,304 | 2/1980 | Clarke et al. | 252/93 |
| 4,348,293 | 9/1982 | Clarke et al. | 252/90 |
| 4,374,747 | 2/1983 | Tai | 252/90 |

FOREIGN PATENT DOCUMENTS

| | | |
|---|---|---|
| 1112534 | 11/1981 | Canada . |
| 8001079 | 5/1980 | European Pat. Off. . |
| 41-7137430 | 11/1966 | Japan . |
| 49-1000306 | 6/1974 | Japan . |
| 51-7684 | 3/1976 | Japan . |
| 52-3134065 | 4/1977 | Japan . |
| 954602 | 4/1964 | United Kingdom . |
| 1197981 | 7/1970 | United Kingdom . |
| 1302063 | 1/1973 | United Kingdom . |
| 1303578 | 1/1973 | United Kingdom . |
| 1316444 | 5/1973 | United Kingdom . |
| 2053733 | 2/1981 | United Kingdom . |
| 2068991 | 8/1981 | United Kingdom . |

Primary Examiner—John E. Kittle
Assistant Examiner—Hoa Van Le
Attorney, Agent, or Firm—Milton L. Honig; James J. Farrell

[57] ABSTRACT

A packaging film comprises a base film of at least partially water-soluble plastics film, for example, polyvinyl alcohol, carrying on one side a protective layer of particulate inert plastics material, for example, polytetrafluoroethylene powder, having a high water repellency. The film is thus vulnerable to attack by aqueous media on one side and protected against such attack on the other. It may be used, with the protected side innermost, for unit packaging of detergent compositions, especially liquids containing bleach. In use in the washing machine, the unprotected surface is attacked by the wash liquor to release the contents; the protective layer prevents attack of the package by the contents during storage.

21 Claims, 3 Drawing Figures

PACKAGING FILM AND PACKAGING OF DETERGENT COMPOSITIONS THEREWITH

The present invention relates to a packaging film and its use in the packaging of products at least partially in liquid form, especially liquid detergents.

The unit packaging of detergents in sachets for direct dosing into washing machines has already been proposed in the literature, but in practice bulk packaging of both powdered and liquid detergents in cartons, drums, bottles and the like is generally employed, although this imposes restraints both on formulations and on methods of production. In particular, products must be designed so that ingredients do not segregate on storage, and this presents particular problems in the case of liquid products with insoluble ingredients. Wastage or underdosage also tends to occur when the consumer is left to judge the correct amount of a product to use.

Unit packaging alleviates these problems and also avoids skin contact of the detergent composition, so that more highly alkaline compositions can be used. The danger of accidental ingestion by children is also lessened.

Sachets for unit packaging of detergent powders are disclosed in U.S. Pat. No. 4,188,304 (Lever Bros. Co.) and EP No. 0 011 500, EP No. 0 011 501, EP No. 0 011 502 and EP No. 0 011 968 (Unilever). These documents disclose sachets of water-insoluble, water-permeable material, which are clearly unsuitable for the packaging of liquids, and sachets designed to open in use. The latter type of sachet requires seals that are sensitive to the wash water, and they would accordingly be unsuitable, in general, for the packaging of liquids.

U.S. Pat. No. 3,277,009 (GAF Corp) discloses packages made of water-soluble film and their use for the packaging of, inter alia, solid detergent compositions and non-aqueous liquids such as petrol and carbon tetrachloride. Such packages are clearly unsuitable for packaging liquids having an appreciable water content since such liquids would attack the package walls.

CA No. 1 112 534 (Procter & Gamble) discloses a package made of water-soluble film containing a detergent suitable for use in an automatic dishwasher, but the package contents must be in the form of a paste which will not dissolve the film.

U.S. Pat. No. 3,186,869, U.S. Pat. No. 3,322,674 and GB No. 954 602 (Friedman) disclose a package for bleach-containing detergents in the form of a bag of water-soluble film material. The problem of attack of the bag walls by the contents is here alleviated by providing the inner surfaces of the bag walls with a barrier coating of waxy or oleaginous material, especially paraffin wax.

U.S. Pat. No. 3,790,067 (Scheier) discloses a disposable container having an inner layer of water-insoluble polymeric film material and an outer layer of water-soluble polymeric material. The outer layer is relatively strong, and the inner layer is sufficiently thin to be shredded under normal atmoshperic forces, or the weight of material in the container, once the outer layer has dissolved away.

U.S. Pat. No. 3,787,382 (General Electric Co.) discloses a process for the production of powdery polytetrafluoroethylene and its use for coating various substrates, for example, metals, glass, quartz, mica, carbon, boron, cotton and other textiles.

U.S. Pat. No. 3,860,117 (Possis Corp.) discloses a method of skin packaging in which a thin blanket of powdered material is interposed between the contiguous surfaces of the packaged article and the transparent thermoplastic packaging film. The powdered material preferably has a particle size less than 15 micrometres and may consist of polytetrafluoroethylene or polypropylene.

In a first aspect, the present invention provides a packaging film comprising a base film of at least partially water-soluble plastics material carrying on one surface only a protective layer, in particulate form, of an inert plastics material having a contact angle to water of at least 80°, said layer being effective to protect the base film surface from attack by aqueous media.

The packaging film has the advantages that, on its unprotected side, it can be dissolved away, or partly dissolved and partly dispersed, by water, whereas on the side carrying the protective layer it is protected from attack by aqueous systems and other aggressive media. It is essential that the inert protective layer be in the form of substantially uncoalesced discrete particles attached firmly to the base film but only loosely or not at all to each other, so that if the base film is dissolved away the protective layer has little or no integrity and is rapidly dispersed.

In a second aspect, the present invention provides a package comprised of the packaging film defined above, having the protective layer on its internal surface(s), so that the layer protects the package from attack by any water present inside the package.

In a third aspect, the present invention provides a package as defined in the previous paragraph containing an at least partially liquid composition that would be capable of attacking the unprotected base film. Advantageously the composition is a detergent composition, in particular one containing a bleach. Such a product is useful for dosing into domestic or commercial washing machines. The contents are released in use by dissolution of the base film by the wash water.

Suitable materials for the base film include polyvinyl alcohol and partially hydrolysed polyvinyl acetate, alginates, carboxymethylcellulose, and methylcellulose. Films of polyvinyl alcohol and polyvinyl acetate/polyvinyl alcohol mixtures are especially suitable. The invention encompasses the use of materials having water-solubilities ranging from partial solubility in hot water to complete solubility in cold water; in the case of a package containing detergent or other washing products intended for washing machine use it is sufficient that water at wash temperatures will cause enough disintegration of the film to allow release of the contents from the package into the wash water. It may be advantageous for the base film to be of thermoplastic material, as explained in more detail below.

The protective layer consists of a solid pulverulent material having a high degree of water-repellency, expressed as a contact angle to water of at least 80°. Examples of materials that may be used are polystyrene (contact angle 86°), polyvinyl chloride, polyethylene, and polypropylene. The contact angle is advantageously at least 90°, and materials having a contact angle to water of at least 100° are especially effective. An especially preferred material is polytetrafluoroethylene (PTFE), which has a contact angle to water of 106°, and other solid polyfluorocarbons are also suitable. The protective material is, as stated above, in the form of discrete particles.

The particles may be adhered to the base film by means of an adhesive. In a preferred embodiment of the invention, however, they are pressed onto the base film when the latter is in a slightly tacky state. The tackiness may be achieved, for example, by heating the film to a temperature slightly above its glass transition temperature; in this method, it is essential that the base film is of thermoplastic material that softens at a substantially lower temperature than does the particulate material of the protective layer. During the pressing process, coalescence of the particles must be minimised by choice of a suitable temperature at which the particles are not softened while the base film is. For example, PTFE particles are not softened at temperatures below 500° C., so that a very wide range of thermoplastic films can be coated with them using this method. Polystyrene, however, has a glass transition temperature of 101° C., and thus polystyrene particles can only be used on conjunction with base films having glass transition temperatures below about 75° C. if this coating method is used.

In an alternative procedure, the tackiness of the base film may be achieved by spraying with a finely-divided jet of water. This method avoids the necessity of temperature matching as described in the previous paragraph.

The thickness of the protective layer will of necessity be low since adhesion between the particles is minimal. Sufficient particulate material must, however, be present to form a layer sufficiently coherent to prevent contact of the package contents with the base film. 100% coverage of the surface area of the base film is not in general necessary in order to provide protection.

It is an essential feature of the packaging film of the invention that one side is protected from attack by aqueous media, by means of the protective particulate layer, while the other side is vulnerable to such attack. The vulnerable side of the film may, if desired, be completely uncoated. Advantageously, however, it may be lightly coated with an inert water-repellent particulate material, but to a lesser extent than the protected side. This measure helps to reduce tackiness in handling. The degree of coating must not, of course, be such that attack of the base film by aqueous media is prevented. The coating material may advantageously be the same as that used for the protective layer.

The thickness of the base film itself should be sufficient to give it the required mechanical strength. Typically the thickness of the film will lie within the range of from 0.002 to 0.01 cm. The film also desirably has a tensile strength of at least 2 to $3 \times 10^3$ p.s.i. (1.4 to $2.1 \times 10^6$ kg/m$^2$) and an initial tear strength of at least 40 to 60 lb/in (700 to 1100 kg/m). High bursting strength is also desirable.

As mentioned above, the base film is advantageously thermoplastic for ease of attachment of the protective layer. It is also advantageously of high heat-sealability, since heat-sealing represents a convenient and inexpensive method of making packages according to the invention.

Advantageously, the packaging film of the invention has uncoated edge or border areas on the side bearing the protective layer, to facilitate heat-sealing.

The package of the invention is conveniently in the form of a bag or sachet. Such a bag may be formed from one or more sheets of the packaging film of the invention or from a tubular section of such film, but it is most conveniently formed from a single folded sheet or from two sheets, sealed together at the edge regions either by means of an adhesive or, preferably, by heat-sealing. A preferred form of sachet according to the invention is a rectangular one formed from a single folded sheet sealed on three sides.

As previously indicated, the film and package of the present invention are especially suitable for the packaging of detergents and other treatment compositions for home laundry use, especially such compositions in liquid form.

Like the sachets disclosed in the previously mentioned U.S. Pat. No. 4,188,304, EP No. 0 011 500, EP No. 0 011 501, EP No. 0 011 502 and EP No. 0 011 968, the films and packages of the present invention can be used for the packaging of particulate detergent compositions, with similar advantages over bulk packaging: the detergent is available in precisely metered quantities, and wastage and under-dosing are both avoided; since skin contact is avoided more highly alkaline powders can be used than would be advisable in bulk packaging; the powders can be of higher density than usual, which decreases packaging, transport and storage costs and simplifies powder processing techniques; appearance of the powder is less important, so that acceptable powders can be produced entirely by simple admixture or by granulation; and flowability of the powder is less important, also leading to process simplification.

The film and package of the invention also possess the additional advantage that they can be used for the packaging of detergents in liquid or paste form. The packing of detergent powders into sachets involves certain difficulties because of their flow and compressibility characteristics; these impose limitations on the rate at which sachets can be filled by machines. Liquids, on the other hand, are substantially incompressible and packing speed is in principle limited only by their viscosity. High-speed packing of liquids into sachets is a well-known and convenient technique.

Unit packaging in sachets or the like is of particular advantage for liquid products containing insoluble ingredients, since the correct proportion of insoluble ingredients in every dose is ensured. In bulk packaging a suspending system is required to achieve this, otherwise the consumer has to shake the container every time the product is used.

Any detergent composition in liquid form may with advantage be packaged using the film and package of the invention. Such detergent compositions are amply described in the literature, for example, in "Surface Active Agents and Detergents", Volumes I and II, by Schwartz, Perry & Berch.

Detergent compositions generally contain as major ingredients one or more detergent-active compounds and one or more detergency builders. Since detergent-active materials are frequently supplied by manufacturers in the form of fairly concentrated aqueous solutions, it is a simple matter to mix the other ingredients in to form liquids, slurries or pastes.

Advantageously the free water content of the final product does not exceed 20% by weight, and more preferably does not exceed 10% by weight; this limitation applies not just to detergent compositions but to any material that can be packaged according to the invention. The term "free water" is used in order to exclude water derived from water of crystallisation in solid ingredients.

The film and package of the invention are especially useful for the packaging of detergent compositions containing reactive or aggressive ingredients, especially bleaching agents. The protective layer prevents or substantially reduces interaction between bleaching agents such as inorganic persalts and the base film.

Although the film and package of the invention have been described with reference principally to the packaging of detergent compositions, they are useful for the packaging of other materials, especially liquids of limited or zero water content, as will be appreciated by the worker skilled in the art.

Figure 2:
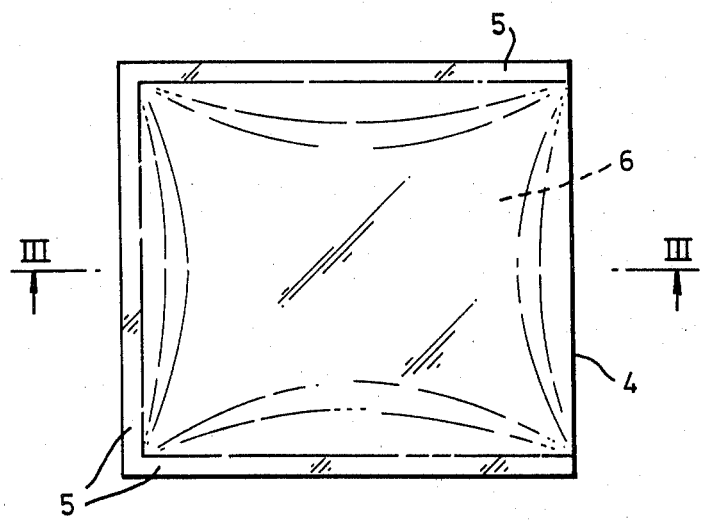
Figure 3:
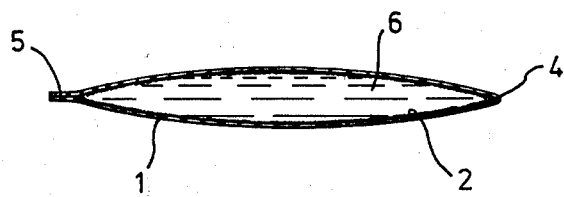

The invention will now be described in more detail, by way of example only, with reference to the accompanying drawings, in which FIG. 1 represents a cross-section through a packaging film according to the invention, FIG. 2 represents a plan view of a sachet constructed from the film of FIG. 1, and FIG. 3 represents a sectional view, in the direction of the arrows, on the line III—III of FIG. 2.

Referring now to FIG. 1 of the accompanying drawings, a packaging film consists of a base film 1 of transparent water-soluble plastics material, for example, polyvinyl alcohol/polyvinyl acetate. Pressed into one surface of the film 1 are discrete particles 2 of an inert pulverulent plastics material, for example, polytetrafluoroethylene. Edge regions 3 of the base film 1 are free of particles so that they can be used for heat-sealing.

FIGS. 2 and 3 show a rectangular sachet formed from a single sheet of the film shown in FIG. 1. The sachet has one folded edge 4 and three heat-sealed edges 5, and contains a liquid detergent composition 6. The particulate layer 2 is on the inner side of the sachet to protect the base film 1 from the liquid detergent 6.

The invention is further illustrated by the following non-limiting Examples.

EXAMPLE 1

Preparation of a Water-Soluble Packaging Film with a Protective Layer of Polytetrafluoroethylene Method (i)

A cold-water-soluble polyvinyl alcohol/polyvinyl acetate film supplied by Enak Ltd, UK having a thickness of 0.0038 cm was heated to a temperature just above its glass transition temperature (70°–80° C.), to render it slightly tacky. Polytetrafluoroethylene powder having an average particle size of 5 $\mu$m, supplied by British Drug Houses Ltd, was sprinkled onto the upper surface of the heated film. The film was then passed between rollers heated to about 150° C., then allowed to cool.

Method (ii)

A polyvinyl alcohol/polyvinyl acetate film as described above was subjected at room temperature to a fine spray of water on one surface only, until that surface became tacky. Polytetrafluoroethylene particles were sprinkled onto the tackified surface, excess particles being brushed off.

The coated film prepared by both methods retained its solubility in water.

EXAMPLE 2

Preparation of Detergent Sachets 10 cm × 10 cm sachets were prepared from the coated films prepared in Example 1. Each sachet was made from a single folded sheet of the film, with one folded edge and two heat-sealed edges, the fourth edge being left unsealed for filling purposes. For comparison, similar sachets of uncoated film were prepared.

A detergent slurry was prepared from the following ingredients:

|  | % (weight) |
| --- | --- |
| Nonionic detergent ($C_{15}$ alcohol condensed with an average of 9 moles of ethylene oxide per mole) | 40 |
| Sodium tripolyphosphate hexahydrate | 37 |
| Sodium perborate tetrahydrate | 20 |
| Sodium carboxymethylcellulose | 1 |
| Silicone oil | 1 |
| Perfume + fluorescer | 1 |

Each sachet was filled with 75 g of detergent slurry and closed by heat-sealing along the fourth edge.

A filled sachet was placed in a Hoover (Trade Mark) Electronic 1100 front-loading automatic washing machine together with a 7 lb soiled fabric load together with detergency monitors. The 40° C. wash cycle was selected.

It was found that the sachet released its contents in less than two minutes from the beginning of the wash cycle and good detergency results were obtained.

EXAMPLE 3

Storage Tests

Sachets prepared as described in Example 2 were subjected to storage in cartons for periods of 4, 24 and 28 weeks under conditions of 20° C./90% relative humidity and 37° C./70% relative humidity. The contents of the sachets were then analysed, by titration of available oxygen, to determine the percentage decomposition of the sodium perborate initially present. The solubilities of the sachets were also tested. The results were as shown in the following Tables.

TABLE 1

| Storage tests at 20° C./90% RH | | | | |
| --- | --- | --- | --- | --- |
| Sachet material | Storage time (weeks) | % bleach decomposed | Solubility* after storage | |
| | | | at 20° C. | at 60° C. |
| Uncoated film | 4 | 15 | VP | G |
| | 24 | 90 | VP | G |
| Coated film | 4 | 5 | G | G |
| | 28 | 40 | G | G |

TABLE 2

| Storage tests at 37° C./70% RH | | | | |
| --- | --- | --- | --- | --- |
| Sachet material | Storage time (weeks) | % bleach decomposed | Solubility* after storage | |
| | | | at 20° C. | at 60° C. |
| Uncoated film | 4 | 20 | VP | G |
| | 24 | 93 | VP | G |
| Coated film | 4 | 10 | G | G |
| | 28 | 45 | P | G |

*Solubility ratings:
VP — Sachet released its contents when immersed in water but sachet film was not soluble.
P — Sachet released its contents but film was not completely soluble.
G — Sachet released its contents and film was soluble.

I claim:

1. A package consisting wholly or partially of plastics film material at least partially soluble in water, wherein said film is provided on its inside surface with a protective layer, in particulate form, of an inert plastics material having a contact angle to water of at least 80°, whereby said inside surface is protected from attack by aqueous media while said film on its outside surface is vulnerable to attack by aqueous media.

2. The package of claim 1, wherein said film is of thermoplastic material.

3. The package of claim 1, wherein said film is of material selected from the group consisting of polyvinyl alcohols and partially hydrolysed polyvinyl acetates.

4. The package of claim 1, wherein said protective layer is of material having a contact angle to water of at least 90°.

5. The package of claim 4, wherein said protective layer is of material having a contact angle to water of at least 100°.

6. The package of claim 1, wherein said protective layer comprises particles of a material selected from the group consisting of polyfluorocarbons, polystyrene, polyvinyl chloride, polyethylene and polypropylene.

7. The package of claim 6, wherein said protective layer comprises particles of polytetrafluoroethylene.

8. The package of claim 1, wherein said outside surface of said film is provided with a light coating of an inert water-repellent plastics material in an amount insufficient to protect that surface from attack by aqueous media, whereby tackiness in handling is reduced.

9. The package of claim 1, which comprises a sachet formed from one or more sheets of the said film.

10. The package of claim 9, wherein said film is thermoplastic and said sachet is joined together by heat-sealing.

11. The package as claimed in of claim 1, which contains a detergent composition.

12. The package of claim 1, which contains an at least partially liquid composition capable of attacking the material of said at least partially water-soluble plastics film.

13. The package of claim 1, which contains a bleaching agent.

14. A packaging film comprising a base film of at least partially water-soluble plastics material carrying on one surface a protective layer, in particulate form, of an inert plastics material having a contact angle to water of at least 80°, said layer being effective to protect said base film surface from attack by aqueous media.

15. The film of claim 14, wherein said base film is of thermoplastic material.

16. The film of claim 14, wherein said base film is of a material selected from the group consisting of polyvinyl alcohols and partially hydrolysed polyvinyl acetates.

17. The film of claim 14, wherein said protective layer is of material having a contact angle to water of at least 90°.

18. The film of claim 17, wherein said protective layer is of material having a contact angle to water of at least 100°.

19. The film of claim 14, wherein said protective layer comprises particles of a material selected from the group consisting of polyfluorocarbons, polystyrene, polyvinyl chloride, polyethylene and polypropylene.

20. The film of claim 19, wherein said protective layer comprises particles of polytetrafluoroethylene.

21. The film of claim 14, wherein that surface of said base film not carrying said protective layer is provided with a light coating of an inert water-repellent plastics material in an amount insufficient to protect that surface from attack by aqueous media.

* * * * *